United States Patent
Cipolla et al.

[19]

[11] Patent Number: 5,864,723
[45] Date of Patent: Jan. 26, 1999

[54] ONE-TIME-USE CAMERA WITH MOTION-RESTRAINT FOR ROTATABLE FRAME COUNTER

[75] Inventors: David Cipolla, Pittsford; Mark A. Lamphron, Rochester, both of N.Y.

[73] Assignee: Eastman Kodak Company, Rochester, N.Y.

[21] Appl. No.: 826,944

[22] Filed: Apr. 8, 1997

[51] Int. Cl.[6] .................................................. G03B 17/24
[52] U.S. Cl. ............................................................ 396/284
[58] Field of Search .................................... 396/284, 395, 396/396

[56] References Cited

U.S. PATENT DOCUMENTS 1,034,870 8/1912 Caldwell .
2,161,941 6/1939 Zapp .
5,502,531 3/1996 Stephenson, III et al. ............. 396/284

*Primary Examiner*—David M. Gray
*Attorney, Agent, or Firm*—Roger A. Fields

[57] ABSTRACT

A camera comprising a film frame counter rotatable at a central hub to successive numbered settings, and a metering cam rotatable in response to film advancement and having at least one tooth for intermittently engaging the frame counter to rotate the frame counter to its next numbered setting when the metering cam is rotated, characterized in that a cantilevered flexible beam has two ends, and is supported at one end to permit the beam to be bent at the other end for the beam to forcibly press between the two ends against the central hub of the frame counter to prevent an unintended rotation of the frame counter, and the metering cam has a cam lobe arranged to bend the beam at its other end for the beam to forcibly press between its two ends against the frame counter when the tooth is not engaged with the frame counter.

7 Claims, 4 Drawing Sheets

5,864,723

ONE-TIME-USE CAMERA WITH MOTION-RESTRAINT FOR ROTATABLE FRAME COUNTER

FIELD OF THE INVENTION

The invention relates generally to the field of photography, and in particular to cameras. More specifically, the invention relates to a one-time-use camera with a motion-restraint for a rotatable frame counter.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a film cartridge in a cartridge receiving chamber, a film take-up spool in a film supply chamber, a fixed-focus taking lens, a film metering mechanism with a rotatably supported metering sprocket that engages the filmstrip, a manually rotatable film advance thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and may have respective openings for the taking lens, the shutter release button, the film advance thumbwheel, the viewfinder, the frame counter wheel, and a flash emission window for the electronic flash.

To use the one-time-use camera, after the photographer takes a picture, he manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket in engagement with the filmstrip, to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. Then, the front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the film cartridge onto the film take-up spool and to rotate the metering sprocket to increment the frame counter to its total-available frame number setting. Lastly, the outer box is placed on the camera unit.

In some models of the one-time-use camera, a metering cam rotatable in response to film advancement after each exposure has at least one tooth for intermittently engaging the frame counter to rotate the frame counter to its next numbered setting when the metering cam is rotated. A problem that may occur is that, each time the tooth is disengaged from the frame counter, the frame counter may undergo a slight rotational creep. As a result, the indicated frame count may become incorrect.

SUMMARY OF THE INVENTION

Broadly speaking, the invention is directed to a camera comprising a movable engageable part, and an actuatable part having at least one discrete engaging member for intermittently engaging the movable part to move the movable part at intervals when the actuatable part is actuated, characterized in that:

a motion-restrainer is supported for movement to forcibly press against the movable part to prevent an unintended movement of the movable part; and the actuatable part has a motion-inducer arranged to move the motion-restrainer to forcibly press against the movable part when the engaging member is not engaged with the movable part.

More specifically, the invention is directed to a camera comprising a film frame counter rotatable at a central hub to successive numbered settings, and a metering cam rotatable in response to film advancement and having at least one tooth for intermittently engaging the frame counter to rotate the frame counter to its next numbered setting when the metering cam is rotated, characterized in that:

a cantilevered flexible beam has two ends, and is supported at one end to permit the beam to be bent at the other end for the beam to forcibly press between the two ends against the central hub of the frame counter to prevent an unintended rotation of the frame counter; and the metering cam has a cam lobe arranged to bend the beam at its other end for the beam to forcibly press between its two ends against the frame counter when the tooth is not engaged with the frame counter. Thus, the problem in the prior art of rotational creep of the frame counter, each time the tooth is disengaged from the frame counter, is solved.

DETAILED DESCRIPTION OF THE INVENTION

The invention is disclosed as being embodied preferably in a one-time-use camera. Because the features of a onetime-use camera are generally known, the description which follows is directed in particular only to those elements forming part of or cooperating directly with the disclosed embodiment. It is to be understood, however, that other elements may take various forms known to a person of ordinary skill in the art.

Figure 1:
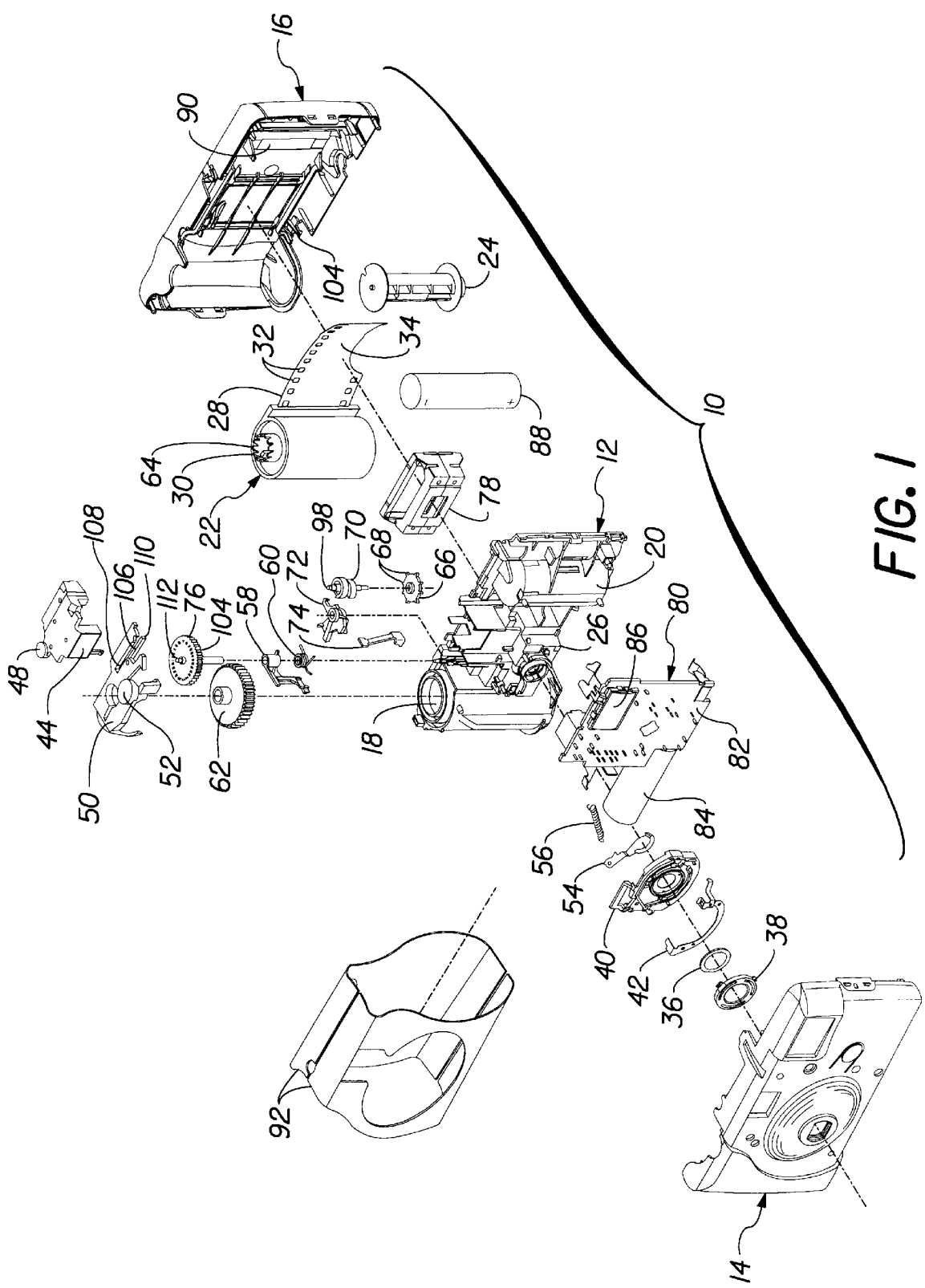
FIG. 1 is an exploded perspective view of a one-time-use camera, including a motion-restraint for a rotatable frame counter, according to a preferred embodiment of the invention.

Referring now to the drawings, FIG. 1 depicts a one-time-use or single-use camera 10 having a plastic main body part 12, and a pair of plastic front and rear cover parts 14 and 16 which connect to one another to house the main body part between them in order to complete the camera assembly. The main body part 12 is adapted to be nested in the front cover part 14, and the rear cover part 16 is intended to be fitted to the main body part 12 to make the main body part light-tight.

As shown in FIG. 1, the main body part 12 has integral cartridge-receiving and unexposed film roll chambers 18 and 20 for a light-tight film cartridge 22 and a film take-up spool 24. The chambers 18 and 20 are located at opposite sides of a backframe opening 26 at which successive frames of a 35 mm filmstrip 28 are exposed during picture-taking. The filmstrip 28 is originally provided in a roll form on a cartridge spool 30 rotatably supported inside the film cartridge 22, and it has a longitudinal series of edge perforations 32 included along a film leader 34 which protrudes from the film cartridge.

Figure 2:
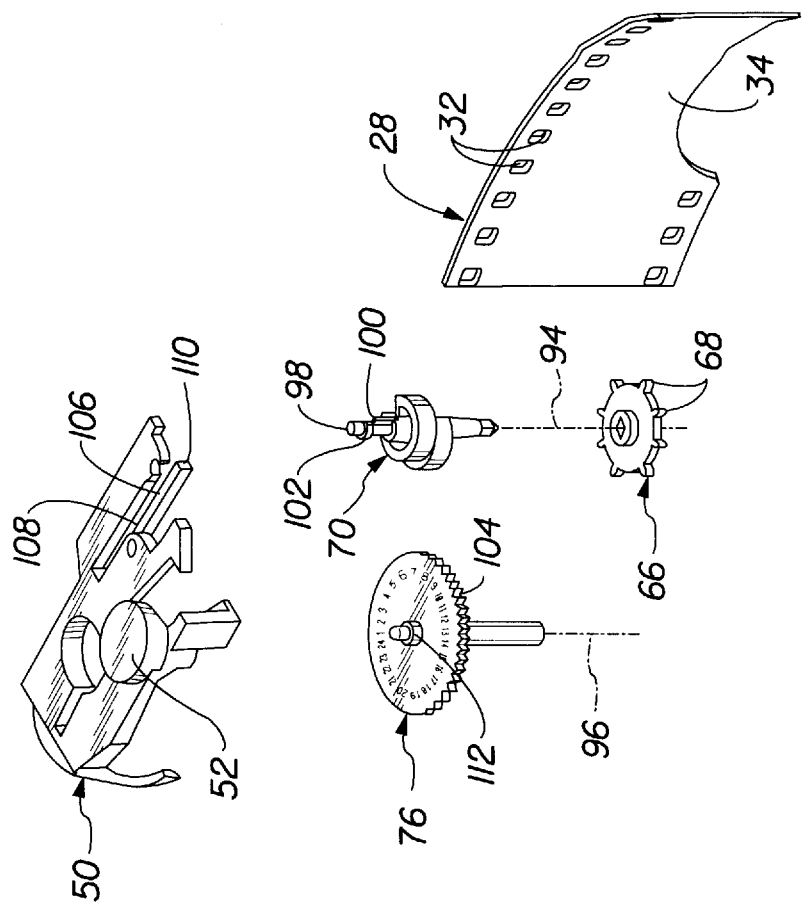
FIG. 2 is an exploded perspective view of the motion-restraint and the frame counter shown in FIG. 1.
Figure 3:
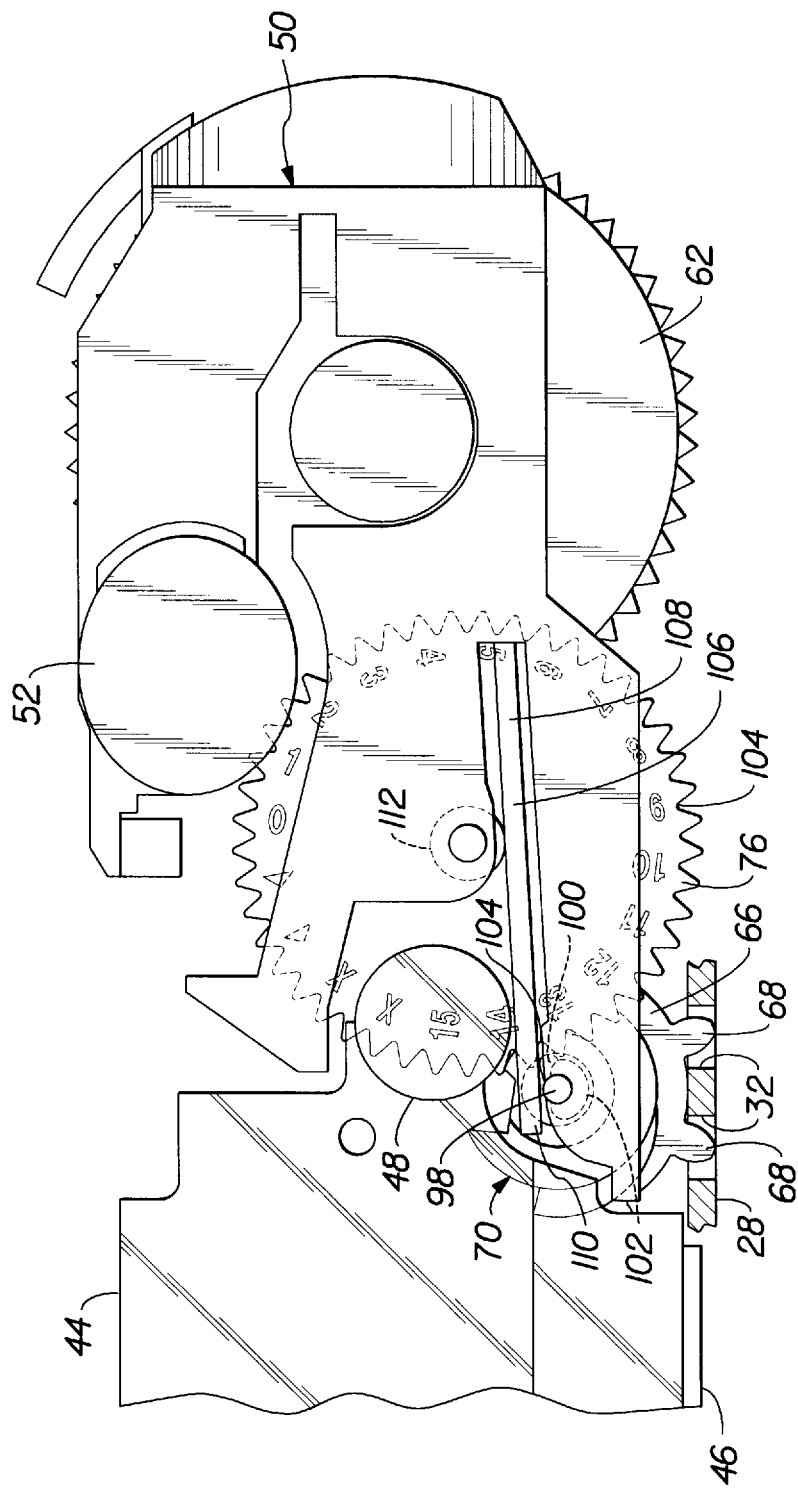
FIGS. 3 and 4 are top plan views of the motion-restraint and the frame counter, depicting their operation.

As shown in FIGS. 1–3, the main body part 12 supports various camera elements which are connected to the main body part before it is nested in the front cover part 14 and the rear cover part 16 is fitted to the main body part to make the main body part light-tight. These camera elements are a fixed-focus taking lens 36 which is sandwiched between a snap-on lens retainer 38 and a lens support plate 40, connected as a unit to the main body part 12 at its front; a shutter-flash synchronization switch contact 42 attached to the lens support plate 40; an integral pair of front and rear viewfinder lenses 44 and 46 (only the front viewfinder lens is shown in FIG. 1) and an integral frame magnifier 48, connected as a unit to the main body part at its top; a shutter mechanism comprising a keeper plate 50 having an integral manually depressable shutter release button 52 for releasing a pivotally mounted shutter blade 54, a shutter return spring 56, a high-energy lever 58 for actuating the shutter blade to pivot the blade open in order to uncover the taking lens to make a film exposure, and a lever actuating spring 60; a film advancing and metering mechanism comprising a manually rotatable thumbwheel 62 for engaging an exposed end 64 of the cartridge spool 30 to rotate the spool in order to wind an exposed frame of the filmstrip 28 into the film cartridge 22 after each film exposure and to move an unexposed frame from an unexposed film roll on the take-up spool 24 to the backframe opening 26 for the next exposure, a film metering sprocket 66 having an annular array of peripheral teeth 68 for successively engaging the respective perforations 32 in the filmstrip, and a cooperating metering cam 70, metering lever 72 and metering spring 74 which operate in a known manner in conjunction with a rotatable frame counter 76 (made readable via the frame magnifier 48), the thumbwheel 62, and the metering sprocket 66 to rotate the frame counter to its next lower-numbered setting and to lock the thumbwheel (until the shutter release button 52 is depressed) after the thumbwheel is rotated to wind an exposed frame into the film cartridge 22; a light baffle 78 which forms the backframe opening 26; and an electronic flash illumination assembly 80 comprising a circuit board 82, a capacitor 84, a flash emission lens 86, and a flash battery 88. The battery 88 is held in a battery-receiving chamber 90 in the main body part 12. A pair of front and rear decorative labels 92 cover central portions of the front and rear cover parts 14 and 16 after the front and rear cover parts are connected to one another to house the main body part 12 between them.

As shown in FIG. 2, the metering sprocket 66 and the metering cam 70 are coaxially fixed to one another for concurrent rotation about an axis 94 when the thumbwheel 62 is manually rotated to rotate the cartridge spool 30 in order to wind an exposed frame of the filmstrip 28 into the film cartridge 22 after each film exposure. The axis 94 is parallel to the axis 96 of the frame counter 76.

Figure 4:
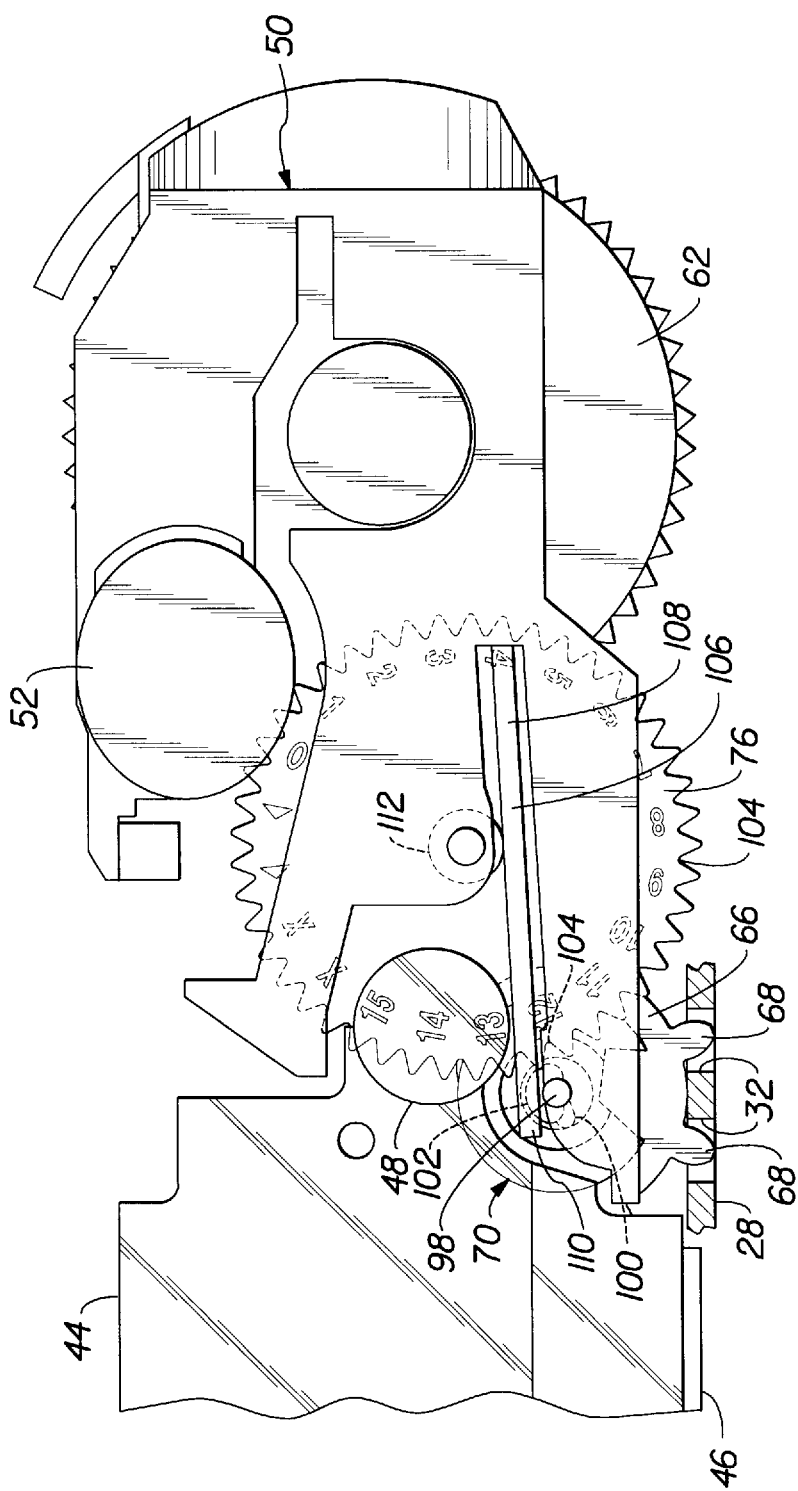

As shown in FIGS. 2–4, the metering cam 70 has a central shaft 98, and an integral single tooth 100 and an integral single cam lobe 102 that project radially from the central shaft. Each time the metering cam 70 is rotated in response to film advancement the tooth 100 intermittently engages the frame counter 76 in one of its peripheral recesses 104 to rotate the frame counter to its next lower-numbered setting. Compare FIGS. 3 and 4.

As shown in FIGS. 2–4, the keeper plate 50 has an integral cantilevered flexible (spring) beam 106 that has two ends, i.e. a supported end 108 and a free end 110. The beam 106 is supported at the supported end 108 to permit the beam to be bent at the free end 110 to forcible press between the two ends against a central hub 112 of the frame counter 76 to prevent any unintended rotation of the frame counter. See FIG. 4. The cam lobe 102 of the metering cam 70 is arranged to bend the beam 106 at the free end 110 for the beam to forcibly press between that end and the supported end 108 against a central hub 112 of the frame counter 76 when the tooth 100 is not engaged with the frame counter in one of its peripheral recesses 104. Thus, the problem in the prior art of rotational creep of the frame counter 76, each time the tooth 100 is disengaged from the frame counter, is solved.

The invention has been described with reference to a preferred embodiment. However, it will be appreciated that variations and modifications can be effected by a person of ordinary skill in the art without departing from the scope of the invention.

PARTS LIST 10 one-time-use camera
12 main body part
14 front cover part
16 rear cover part
18 cartridge-receiving chamber
20 unexposed film roll chamber
22 film cartridge
24 film take-up spool
26 backframe opening
28 filmstrip
30 cartridge spool
32 edge perforations
34 film leader
36 taking lens
38 lens retainer
40 lens support plate
42 shutter-flash synchronization switch contact
44 front viewfinder lens
46 rear viewfinder lens
48 frame magnifier
50 keeper plate
52 shutter release button
54 shutter blade
56 shutter return spring
58 high-energy lever 60 lever actuating spring
62 thumbwheel
64 exposed end of spool 30
66 film metering sprocket
68 peripheral teeth
70 metering cam
72 metering lever
74 metering spring
76 frame counter
78 light baffle
80 electronic flash illumination assembly
82 circuit board
84 capacitor
86 flash emission lens
88 battery
90 battery-receiving chamber
92 front and rear labels
94 axis
96 axis
98 central shaft
100 tooth
102 cam lobe
104 peripheral recesses
106 beam
108 supported end
110 free end
112 central hub

What is claimed is:

1. A camera comprising a movable engageable part, and an actuatable part having at least one discrete engaging member for intermittently engaging said movable part to move said movable part at intervals in only one direction when said actuatable part is actuated, is characterized in that:

a motion-restrainer is supported for movement to forcibly press against said movable part to prevent an unintended movement of the movable part in said one direction; and said actuatable part has a motion-inducer arranged to move said motion-restrainer to forcibly press against said movable part when said engaging member is not engaged with the movable part.

2. A camera comprising a rotatable engageable part rotatable about an axis, and a rotatable actuating part rotatable about an axis parallel to the axis of said rotatable engageable part and having at least one engaging member for intermittently engaging said rotatable engageable part to rotate the rotatable engageable part at intervals when said actuating part is rotated, is characterized in that:

a motion-restrainer is supported for movement to forcibly press against said rotatable engageable part to prevent an unintended rotation of the rotatable engageable part; and said actuating part has a cam member arranged to move said motion-restrainer to forcibly press against said rotatable engageable part when said engaging member is not engaged with the rotatable engageable part.

3. A camera comprising a film frame counter rotatable to successive numbered settings, and a metering cam rotatable in response to film advancement and having at least one tooth for intermittently engaging said frame counter to rotate the frame counter to its next numbered setting when said metering cam is rotated, is characterized in that:

a motion-restrainer is supported for movement to forcibly press against said frame counter to prevent an unintended rotation of the frame counter; and said metering cam has a cam lobe arranged to move said motion-restrainer to forcibly press against said frame counter when said tooth is not engaged with the frame counter.

4. A camera as recited in claim 3, wherein said frame counter has a central hub, and said motion-restrainer includes a spring-beam that is flexed to forcibly press against said hub to prevent any unintended rotation of the frame counter.

5. A camera as recited in claim 3, wherein said metering cam has a central shaft, and said tooth and said cam lobe project radially from said central shaft.

6. A camera as recited in claim 5, wherein a metering sprocket is rotatable in engagement with a filmstrip during film advancement, and said metering cam is coaxially fixed to said metering sprocket.

7. A camera comprising a film frame counter rotatable at a central hub to successive numbered settings, and a metering cam rotatable in response to film advancement and having at least one tooth for intermittently engaging said frame counter to rotate the frame counter to its next numbered setting when said metering cam is rotated, is characterized in that:

a cantilevered flexible beam has two ends, and is supported at one end to permit said beam to be bent at the other end for the beam to forcibly press between the two ends against said central hub of the frame counter to prevent an unintended rotation of the frame counter; and said metering cam has a cam lobe arranged to bend said beam at said other end for the beam to forcibly press between said two ends against said frame counter when said tooth is not engaged with the frame counter.

* * * * *